No. 653,804. Patented July 17, 1900.
H. HARDEN.
DEHORNING KNIFE.
(Application filed Apr. 14, 1900.)
(No Model.)
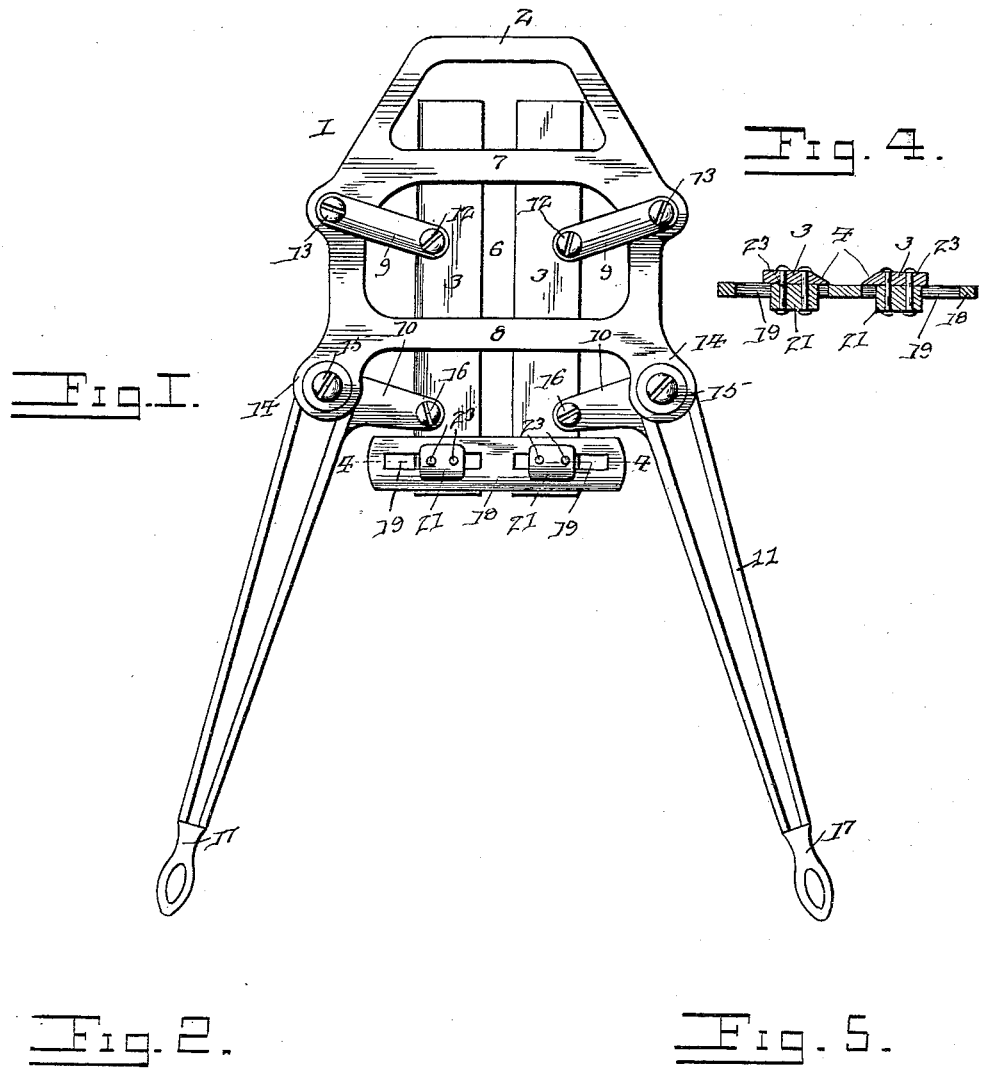
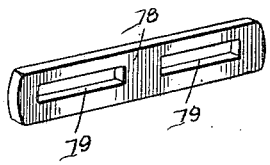
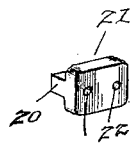
Witnesses
F. E. Alden.
J. H. Riley
Harry Harden, Inventor
By his Attorneys,
C. A. Snow & Co.

UNITED STATES PATENT OFFICE.

HARRY HARDEN, OF LONDON, OHIO, ASSIGNOR OF ONE-HALF TO JOHN CARTER AND MISSOURI CARTER, OF SAME PLACE.

DEHORNING-KNIFE.

SPECIFICATION forming part of Letters Patent No. 653,804, dated July 17, 1900.

Application filed April 14, 1900. Serial No. 12,880. (No model.)

*To all whom it may concern:*

Be it known that I, HARRY HARDEN, a citizen of the United States, residing at London, in the county of Madison and State of Ohio, have invented a new and useful Dehorning-Knife, of which the following is a specification.

The invention relates to improvements in dehorning-knives.

One object of the present invention is to improve the construction of dehorning devices and to provide a simple, inexpensive, and efficient one adapted to be easily operated and capable of enabling the necessary force to be readily applied to sever a horn properly from the head of an animal.

A further object of the invention is to provide a dehorning-knife having a pair of blades to engage the opposite sides of a horn and to enable such blades to be moved longitudinally during the operation of cutting to produce a draw cut or shear-like action, whereby the cutting operation is rendered more effective; and another object of the invention is to retain such blades in parallelism and to advance them equally and simultaneously.

The invention consists in the construction and novel combination and arrangement of parts hereinafter fully described, illustrated in the accompanying drawings, and pointed out in the claims hereto appended.

In the drawings, Figure 1 is an elevation of a dehorning-knife constructed in accordance with this invention. Fig. 2 is a detail perspective view of the transverse connecting-piece. Fig. 3 is a detail sectional view taken longitudinally of one of the blades and illustrating the manner of connecting the blades to the transverse guiding and connecting piece. Fig. 4 is a transverse sectional view on line 4 4 of Fig. 1. Fig. 5 is a detail perspective view of one of the flanged plates for securing the connecting and guiding piece to the blades.

Like numerals of reference designate corresponding parts in all the figures of the drawings.

1 designates a frame having a tapered outer portion 2 and composed of sides and connecting cross-pieces which support longitudinally-disposed blades 3. The blades are provided with inner cutting edges 4, and the horn to be operated on is received within the opening 6, between the cross-pieces 7 and 8, and during the operation of cutting the blades are moved inward toward each other and also longitudinally of the frame, whereby an effective cutting action is produced. The blades, which are arranged parallel with each other and which extend longitudinally of the frame, at opposite sides of the center thereof, are connected near their outer edges with links 9 and with arms 10 of bell-crank-lever handles 11, the arms 10 being of the same length as the links 9 and constituting a pair of links. The links 9 are provided at their inner and outer ends with perforations for the reception of fastening devices 12 and 13, forming pivots for connecting the inner ends of the links with the blades and for securing the outer ends of the links to the sides of the frame. The sides of the frame are enlarged and perforated at the outer ends of the links 9 to form ears for the pivots.

The bell-crank-lever handles are fulcrumed at their angles on extensions or ears 14 of the sides of the frame, and these extensions or ears, which are arranged at the inner end of the frame, are perforated for the reception of fastening devices 15. The outer ends of the arms 10 are pivoted to the outer edges of the blades at 16, and the outer ends of the bell-crank levers are provided with suitable grips or handles 17 and are adapted to be brought together to cause the arms 10 and the links 9 to oscillate and move the blades inward and longitudinally.

In order to preserve the parallelism of the blades and to cause them to be advanced simultaneously and uniformly, they are connected at their inner ends by a transverse piece 18, provided with opposite slots 19, through which pass suitable fastening devices for slidably securing the blades to the connecting and guiding piece. The slots 19, which extend longitudinally of the connecting-piece at opposite sides of the center, receive webs or flanges 20 of plates 21, and these flanged plates extend across the slots and engage the outer face of the connecting and guiding piece, as clearly illustrated in Figs. 1 and 3 of the accompanying drawings. The plates 21 are provided with perforations 22 for the reception of fastening devices 23, which extend through the webs or flanges 20 and the blades. By slidably securing the transversely-disposed connecting and guiding piece to the inner ends of the blades the latter are caused to move inward and longitudinally equally or uniformly when the outer portions or arms of the bell-crank levers are moved inward toward each other. These bell-crank levers may be constructed of any suitable metal, and their outer arms may be made of any desired length to obtain the necessary leverage.

It will be seen that the dehorning-knife is exceedingly simple and inexpensive in construction, that it is easily operated, and that the blades are moved inward with great force and have a longitudinal movement simultaneously with such inward movement to exert a shear-like cutting action. Furthermore, it will be apparent that the beveled cutting edges are brought together at the center of the frame and that they are capable of making a clean and effective cut.

What is claimed is—

1. A device of the class described comprising a frame provided with an opening, a pair of parallel blades mounted on the frame at opposite sides of the opening, and means for moving the blades longitudinally and laterally simultaneously, substantially as described.

2. A device of the class described comprising a frame provided with a central opening, a pair of parallel blades located at opposite sides of the opening of the frame and adapted to move longitudinally and laterally simultaneously, links connected with the frame and with the blades, and means for actuating the blades, substantially as described.

3. A device of the class described comprising a frame provided with an opening, a pair of parallel blades adapted to move longitudinally and transversely of the frame, links connecting the blades with the frame, and a pair of levers fulcrumed on the frame and connected with and adapted to actuate the blades, the portions of the levers connecting the frame and the blades being arranged parallel with the links, substantially as described.

4. A device of the class described comprising a frame, a pair of blades capable of moving longitudinally and laterally of the frame simultaneously, links connecting the outer portion of the blades with the frame, and a pair of bell-crank levers forming handles and fulcrumed on the frame and connected with the inner portions of the blades, substantially as described.

5. A device of the class described comprising a frame provided with an opening, parallel blades located at opposite sides of the opening and arranged to move laterally and longitudinally simultaneously, means for actuating the blades, and a device connecting the blades and arranged independently of the frame and the actuating mechanism and adapted to cause the blades to be advanced uniformly, substantially as described.

6. A device of the class described comprising a frame, parallel blades adapted to move longitudinally and laterally of the frame, means for actuating the blades, and a connecting and guiding piece slidably secured to the blades whereby the latter are retained in parallelism and are caused to be advanced uniformly, substantially as described.

7. A device of the class described comprising a frame, parallel blades adapted to move longitudinally and laterally of the frame, a transversely-disposed slotted connecting-piece arranged on the blades, and flanged plates mounted on the blades and engaging the connecting-piece and having webs or flanges arranged in the slots thereof, substantially as described.

In testimony that I claim the foregoing as my own I have hereto affixed my signature in the presence of two witnesses.

HARRY HARDEN.

Witnesses:
B. P. JONES,
J. F. KIRKPATRICK.